3,151,146
PHOSPHONIC AND PHOSPHINIC ACID ESTERS OF α- AND β-NAPHTHOLS AND PROCESSES FOR THEIR PRODUCTION
Gerhard Schrader, Wuppertal-Cronenberg, and Hanshelmut Schlör, Wuppertal-Barmen, Germany, assignors to Farbenfabriken Bayer Aktiengesellschaft, Leverkusen, Germany, a corporation of Germany
No Drawing. Filed Dec. 29, 1960, Ser. No. 79,161
Claims priority, application Germany Dec. 31, 1959
7 Claims. (Cl. 260—461)

The present application relates to and has as its objects new and useful derivatives of α- or β-naphthols in which the phenolic OH group is esterified with the radical of a (thiono-) phosphonic or (thiono) phosphinic acid and processes for their production.

The new inventive compounds, which are distinguished by a remarkable insecticidal and fungicidal activity, may be represented by the following general formula:

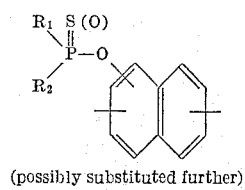

(possibly substituted further)

in which $R_1$ and $R_2$ stand for aliphatic or aromatic radicals, one of them may be attached to the p-atom via an oxygen, sulfur or nitrogen atom. The naphthol radical furthermore may be substituted by substituents such as alkyl-, alkoxy-, halogen-, nitro-, amino-groups and the like.

These compounds can be produced by ways known in principle, e.g. by reacting α- or β-naphthols which may be further substituted with (thiono) phosphonic or (thiono) phosphinic acid halides. To accelerate this esterification reaction it is sometimes expedient to add a small catalytically active amount of copper powder to the reaction mixture.

The compounds of the present invention are highly active pest control agents which surprisingly exhibit, in addition to their insecticidal action, systemic fungicidal action which has hitherto not been observed in the group of organic phosphoric acid compounds.

They very effectively kill insects like flies, mites, aphids, etc. They distinguish themselves especially by a good contact insecticidal activity and at the same time by an activity on eating insects such as caterpillars. The compounds may be used in the same manner as other known phosphoric acid insecticides, i.e. in a concentration from about 0.00001% to about 1%, diluted or extended with suitable solid or liquid carriers or diluents. Examples of such solid carriers are talc, chalk, bentonite, clay and the like, as liquid carriers there may be mentioned water (if necessary with commercial emulsifiers), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers etc.

As an example for the special utility of the inventive compounds the esters of the following formulae

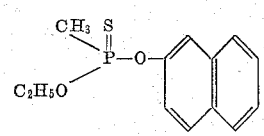

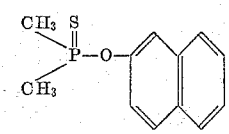

have been tested against spider mites. Aqueous solutions of the aforesaid compounds have been prepared by admixing them with the same amount of an auxiliary solvent (acetone). A commercial emulsifier (benzyl hydroxy diphenyl polyglycol ether) is added in an amount of 20% referred to active ingredient. This premixture then is diluted with water to the desired concentration. The tests have been carried out as follows:

Against spider mites (contact-insecticidal action). Bean plants (*Phaseolus vulgaris*) of about 15 inches height were sprayed drip wet with solutions as prepared above in a concentration as shown below. The bean plants have been infested heavily with the two-spotted spider (species *Tetranychus telarius*). Evaluation has been carried out after 24 hours, 48 hours and 8 days. The following results have been obtained:

Spider mites were killed completely with 0.01% solutions.

The following examples are given for the purpose of illustrating this invention.

*Example 1*

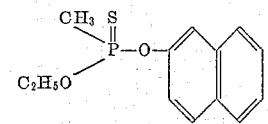

42 g. (0.25 mol) of the sodium salt of β-naphthol are dissolved in 200 ml. of methyl ethyl ketone. 40 g. of methyl-thionophosphonic acid-O-ethyl ester chloride (B.P. 60° C./12 mm. Hg) are added thereto at 30–40° C. while stirring. The reaction product is kept at 40° C. for an hour and then placed in 400 ml. of ice-water. The separated oil is taken up with 300 ml. of benzene and washed with a 3% aqueous sodium bicarbonate solution until neutral. The benzene solution is dried over sodium sulfate and fractionated. In this way, 37 g. of the new ester of B.P. 123° C./0.01 mm. Hg are obtained. Yield 56% of the theoretical. Mean toxicity on rats per os: 250 mg./kg.

Spider mites are killed completely with 0.01% solutions. The compound shows an ovicidal action against the eggs of the red spider.

*Example 2*

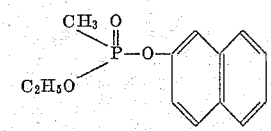

42 g. (0.25 mol) of the sodium salt of β-naphthol are dissolved in 200 ml. of methyl ethyl ketone. 36 g. of methyl-phosphonic acid-O-ethyl ester chloride (B.P. 45° C./2 mm. Hg) are then added thereto at 30° C. The mixture is stirred at 30° C. for an hour and then worked up as described in Example 1. In this way, 36 g. of the new ester of B.P. 115° C./0.01 mm. Hg are obtained. Yield 58% of the theoretical. Mean toxicity on rats per os: 250 mg./kg.

Spider mites are killed completely with 0.01% solutions.

Example 3

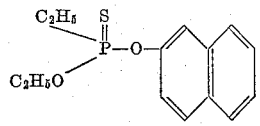

42 g. (0.25 mol) of the sodium salt of β-naphthol are dissolved in 200 ml. of methyl ethyl ketone. 44 g. of ethyl-thionophosphonic acid-O-ethyl ester chloride (B.P. 48° C./1 mm. Hg) are added thereto at 40° C. while stirring. The mixture is kept at 40° C. for one hour and then worked up as described in Example 1. In this way, 45 g. of the new ester of B.P. 128° C./0.01 mm. Hg are obtained. Yield 64% of the theoretical. Mean toxicity on rats per os: 500 mg./kg.

Spider mites are killed completely with 0.01% solutions. The compound shows an ovicidal action against the eggs of the red spider.

Example 4

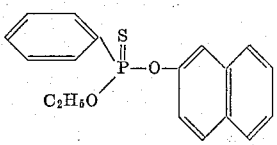

144 g. (1 mol) of β-naphthol are dissolved in 1000 ml. of benzene. 150 g. of finely powdered anhydrous potassium carbonate mixed with 1 g. of copper powder are added thereto. 221 g. of phenyl-thionophosphonic acid-O-ethyl ester chloride (B.P. 75° C./0.01 mm. Hg) are added dropwise at 80° C. with good stirring. The mixture is kept at 80° C. for 3 hours, then cooled to room temperature and 100 ml. of water are added. The salts formed are filtered off with suction and the filtrate washed with a 3% sodium bicarbonate solution. The benzene solution is subsequently dried over sodium sulfate. The benzene is then evaporated under vacuum. In this way, 225 g. of the new ester are obtained as a yellow-brown, water-insoluble liquid. Yield 69% of the theoretical. Mean toxicity on rats per os: 1000 mg./kg. 0.0125% solutions of the compound show systemic action against *Fusarium oxisporium* lycopers.

By the same way there may be obtained the following compound:

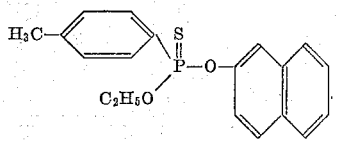

Example 5

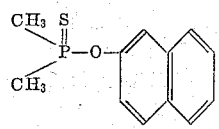

42 g. (0.25 mol) of the sodium salt of O-naphthol are dissolved in 200 ml. of methyl ethyl ketone. 33 g. of dimethyl-thionophosphinic acid chloride are added to the solution at 40° C. The reaction product is heated at 40° C. for a further hour and then placed in 400 ml. of ice-water. The separated oil is taken up with 300 ml. of benzene. The benzene solution is washed with a 3% aqueous sodium bicarbonate solution until neutral. The benzene solution is subsequently dried over sodium sulfate. Upon distilling off of the solvent the new ester solidifies in crystalline form. After recrystallisation from acetic ester/ligroin it shows a melting point of 88–89° C. In this way, 45 g. of the new ester are obtained. Yield 76% of the theoretical. Mean toxicity on rats per os: 1000 mg./kg.

Spider mites are killed completely with 0.01% solutions. The compound shows an ovicidal action against the eggs of the red spider.

Example 6

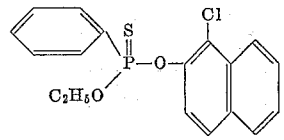

36 g. (0.2 mol) of 1-chloro-2-naphthol (M.P. 70° C.) are dissolved in 300 ml. of benzene and a sodium methylate solution containing 0.2 mol of dissolved sodium is added while stirring. Benzene and methanol are then distilled off under vacuum. The residual sodium salt is dissolved in 200 ml. of methyl ethyl ketone. 44 g. of phenyl-thionophosphonic acid-O-ethyl ester chloride are then added dropwise at 30° C. with good stirring. The mixture is heated to 40° for a further hour and then worked up in usual manner. In this way, 62 g. of the new ester are obtained as a dark brown, water-insoluble oil. Yield 83% of the theoretical.

Example 7

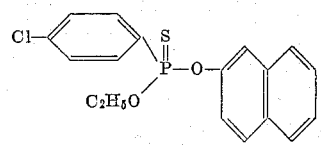

22 g. (0.15 mol) of β-naphthol are dissolved in 250 ml. of benzene. A sodium methylate solution containing 0.15 mol of dissolved sodium is added to this solution. Benzene and methanol are subshequently distilled off under vacuum. The resulting sodium salt is dissolved in 250 ml. of methyl ethyl ketone. 39 g. of p-chlorophenyl-thionophosphonic acid-O-ethyl ester chloride (B.P. 131° C./3 mm. Hg) are then added to 40° C. with good stirring. The mixture is kept at 40° C. for a further hour and then worked up in the usual manner. In this way, 44 g. of the new ester are obtained as a dark brown, water-insoluble oil. Yield 61% of the theoretical.

Example 8

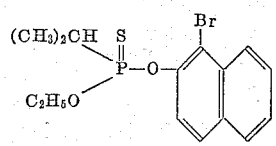

45 g. (0.2 mol) of 1-bromo-2-naphthol (M.P. 86° C.) are dissolved in 300 ml. of benzene. A sodium methylate solution containing 0.2 mol of dissolved sodium is added to this solution. Benzene and methanol are subsequently distilled off under vacuum. The resulting sodium salt is dissolved in 200 ml. of methyl ethyl ketone. 41 g. of isopropyl-thionophosphonic acid-O-ethyl ester chloride (B.P. 50° C./2 mm. Hg) are then added to 40° while stirring. The mixture is kept at 40° C. for a further hour and then worked up in usual manner. 58 g. of the new ester are thus obtained as a dark brown, water-insoluble oil. Yield 78% of the theoretical.

Example 9

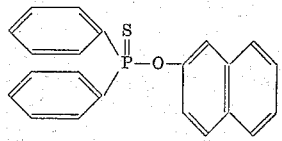

36 g. (0.25 mol) of β-naphthol are dissolved in 50 ml. of methanol. A sodium methylate solution containing 0.25 mol of dissolved sodium is added thereto. The mixture is stirred at 60° C. for 15 minutes and 300 ml. of benzene are then added. Subsequently, benzene and methyl alcohol are distilled off under vacuum. The residual sodium salt is taken up with 200 ml. of acetonitrile. 64 g. of diphenyl-thionophosphinic acid chloride (B.P. 150° C./0.1 mm. Hg) are then added at 40° C. while stirring. The mixture is kept at 40° C. for one hour and then worked up in usual manner. 57 g. of the new ester are thus obtained as a white crystalline mass. After recrystallisation from acetic ester/ligroin, the ester is obtained as colorless needles of M.P. 118° C. Yield 63% of the theoretical.

*Example 10*

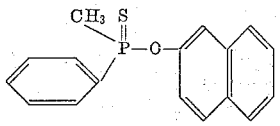

36 g. (0.25 mol) of β-naphthol are converted into the sodium salt in usual manner with the equivalent amount of sodium methylate. The sodium salt is dissolved in 200 ml. of acetonitrile. 48 g. of methyl-phenyl-thionophosphinic acid chloride (B.P. 90° C./1 mm. Hg) are added to the solution at 40° C. The mixture is heated at 40° C. for one hour and then worked up in usual manner. 50 g. of the new ester are thus obtained as a dark brown, water-insoluble oil. Yield 67% of the theoretical.

*Example 11*

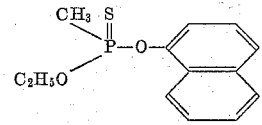

36 g. (0.25 mol ) of α-naphthol are dissolved in 300 ml. of benzene. A sodium methylate solution containing 0.25 mol of dissolved sodium is added thereto. Benzene and methyl alcohol are subsequently distilled off under vacuum. The resulting sodium salt is taken up with 200 ml. of methyl ethyl ketone. 40 g. of methyl-thionophosphonic acid-O-ethyl ester chloride are added dropwise to this solution at 40° C. The reaction product is kept at 40° C. for a further hour and then worked up in usual manner. 42 g. of the new ester of B.P. 119° C./0.01 mm. Hg are thus obtained. Yield 63% of the theoretical. Mean toxicity on rats per os: 100 mg./kg.
Aphids are killed completely with 0.1% solutions.

*Example 12*

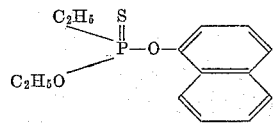

In a similar manner there are obtained from 36 g. (0.25 mol) of α-naphthol and 44 g. of ethyl-thionophosphonic acid-O-ethyl ester chloride, 35 g. of the new ester. The ester boils at 120° C./0.01 mm. Hg. Yield 50% of the theoretical.
Spider mites are killed completely with 0.1% solutions.

*Example 13*

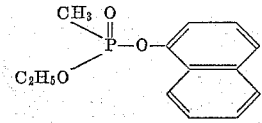

36 g. (0.25 mol of α-naphthol are converted in usual manner into the sodium salt. The latter is dissolved in 200 ml. of methyl ethyl ketone. 36 g. of methyl-phosphonic acid-O-ethyl ester chloride are subsequently added at 30° C. The mixture is kept at 30° C. for one hour and then worked up in usual manner. 42 g. of the new ester of B.P. 114° C./0.01 mm. Hg are thus obtained. Yield 66% of the theoretical.
Aphids are killed completely with 0.1% solutions.

*Example 14*

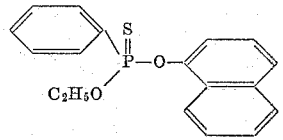

36 g. (0.25 mol) of α-naphthol are dissolved in 300 ml. of benzene. A sodium methylate solution containing 0.25 mol of dissolved sodium is added thereto. The mixture is kept at 60° C. for one hour and benzene and methyl alcohol are then distilled off under vacuum. The resulting sodium salt is dissolved in 200 ml. of methyl ethyl ketone. 56 g. of phenyl-thionophosphonic acid-O-ethyl ester chloride are then added at 40° C. The mixture is kept at 40° C. for a further hour and then worked up in usual manner. 65 g. of the new ester are thus obtained as a brown, water-insoluble oil. Yield 79% of the theoretical. On rats per os 1000 mg./kg. show no symptoms.

*Example 15*

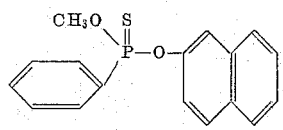

29 g. (0.2 mol) of β-naphthol are converted in usual manner into the sodium salt which is dissolved in 300 ml. of methyl ethyl ketone. Subsequently, 41 g. (0.2 mol) of phenylthionophosphonic acid-O-methyl ester chloride (B.P. 89–98° C./1 mm. Hg) are added dropwise while keeping the temperature at 20° C. by cooling. The mixture is then further heated to 60° C. for one hour and worked up in usual manner. 51 g. of the new ester are thus obtained as a water-insoluble oil. Yield 81% of the theoretical.

*Example 16*

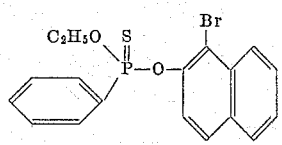

45 g. (0.2 mol) of 1-bromo-2-naphthol are converted into the sodium salt and the latter is dissolved in 300 ml. of methyl ethyl ketone. 44 g. (0.2 mol) of phenyl-thionophosphonic acid-O-ethyl ester chloride are added dropwise at 20° C. and the mixture is kept at 60° C. for one hour. After working up in usual manner, 65 g. of the new ester are obtained as a pale brown oil. Yield 80% of the theoretical.

*Example 17*

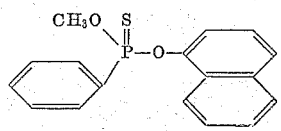

In a similar manner there are obtained from 29 g. (0.2 mol) of α-naphthol and 41 g. (0.2 mol) of phenyl-thionophosphonic acid-O-methyl ester chloride, 54 g. of the new ester. Yield 86% of the theoretical.
Caterpillars are killed completely with 0.1% solutions.
By the same way there may be obtained the following compound:

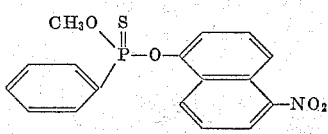

Example 18

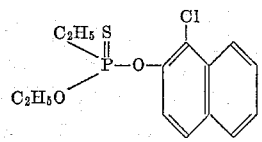

By reacting 36 g. (0.2 mol) of 1-chloro-2-naphthol with 35 g. (0.2 mol) of ethyl-thionophosphonic acid-O-ethyl ester chloride, 52 g. of the above ester are obtained. Yield 83% of the theoretical.

Caterpillars are killed completely with 0.1% solutions.

Example 19

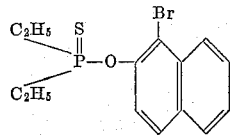

By reacting 45 g. (0.2 mol) of 1-bromo-2-naphthol with 32 g. (0.2 mol) of diethyl-thionophosphinic acid chloride, 58 g. of the above ester are obtained. The product has a melting point of 38–41° C. and can be recrystallised from cyclohexane. Yield 85% of the theoretical.

Caterpillars are killed completely with 0.1% solutions.

Example 20

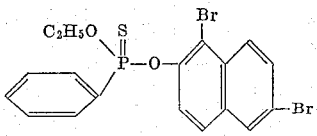

By reacting 45 g. (0.15 mol) of 1.6-dibromo-2-naphthol (M.P. 107–109° C.) with 34 g. (0.15 mol) of phenyl-thionophosphonic acid-O-ethyl ester chloride, 49 g. of the above ester are obtained as a viscous oil. Yield 50% of the theoretical.

Example 21

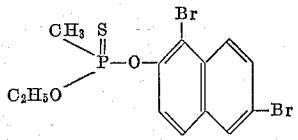

45 g. (0.15 mol) of 1.6-dibromo-2-naphthol are reacted in usual manner with 27 g. (0.17 mol) of methyl-thionophosphonic acid-O-ethyl ester chloride. 49 g. of the new ester are thus obtained which can be recrystallised from cyclohexane. M.P. 47–50° C. Yield 56% of the theoretical.

Caterpillars are killed completely with 0.1% solutions.

Example 22

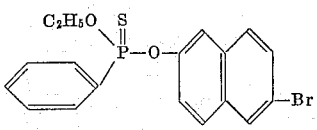

From 45 g. (0.2 mol) of 6-bromo-2-naphthol (M.P. 125–127° C.) and 44 g. (0.2 mol) of phenyl-thionophosphonic acid-O-ethyl ester chloride there are obtained 65 g. of the above compound. Yield 80% of the theoretical.

Caterpillars are killed completely with 0.1% solutions.

Example 23

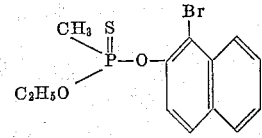

By reacting 45 g. (0.2 mol) of 1-bromo-2-naphthol with 39 g. (0.25 mol) of methyl-thionophosphonic acid-O-ethyl ester chloride there are obtained 51 g. of the above ester. Yield 74% of the theoretical.

Aphids are killed completely with 0.1% solutions.

Example 24

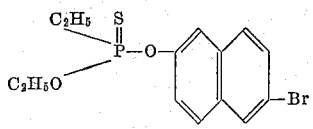

45 g. (0.2 mol) of 6-bromo-2-naphthol are reacted in usual manner with 49 g. (0.28 mol) of ethyl-thionophosphonic acid-O-ethyl ester chloride. 64 g. of the new ester are thus obtained as a yellow-brown oil. Yield 79% of the theoretical.

Example 25

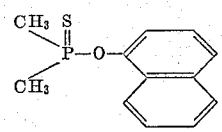

72 g. (0.5 mol) of α-naphthol are dissolved in 50 ml. of methanol. A sodium methylate solution containing 0.5 mol of dissolved sodium is added thereto. Subsequently, 300 ml. of benzene are added, and benzene and methyl alcohol distilled off azeotropically. The residual sodium salt of α-naphthol is dissolved in 200 ml. of acetonitrile. 65 g. of dimethyl-thionophosphinic acid chloride (B.P. 46° C./1 mm. Hg) are added thereto at 45° C. while stirring. The reaction product is heated at 50° C. for a further hour and then placed in 400 ml. of ice-water. After working up in usual manner, 70 g. of the new ester are obtained. Yield 62% of the theoretical. The ester crystallises from a mixture of equal parts of ethyl acetate and ligroin as colorless needles of M.P. 111° C.

By the same way there may be obtained the following compound:

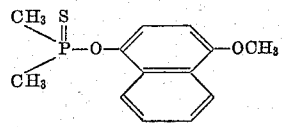

Example 26

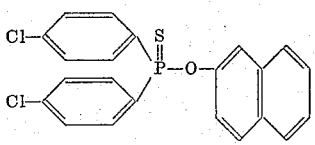

72 g. (0.5 mol) of β-naphthol are dissolved in 50 ml. of methanol. A sodium methylate solution containing 0.5 mol of dissolved sodium is added thereto. As described in the preceding example, 300 ml. of benzene are then added and methyl alcohol and benzene distilled off azeotropically. The residual sodium salt of β-naphthol is dissolved in 200 ml. of acetonitrile. 161 g. of 4,4-dichlorophenyl-thionophosphinic acid chloride (M.P. 86–87° C.) are added at 40° C. while stirring. After working up in usual manner, 129 g. of the new ester are obtained as a viscous, water-insoluble oil. Yield 61% of the theoretical.

Calculated for mol 429: Cl, 16.6%; P, 7.2%; S, 7.5%. Found: Cl, 16.6%; P, 7.4%; S, 7.8%.

Example 27

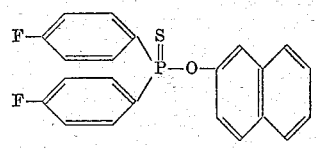

72 g. (0.5 mol) of β-naphthol are dissolved in 50 ml. of methanol and subsequently converted into the sodium salt as described in the preceding example. To the solution of the sodium salt in 200 ml. of acetonitrile there are added at 45° C. while stirring 145 g. of 4.4-difluorophenyl-thionophosphinic acid chloride (M.P. 65° C.). The mixture is stirred at 50° C. for one hour and then worked up in usual manner. 65 g. of the new ester are thus obtained. Yield 34% of the theoretical. The ester crystallises from a mixture of equal parts of ethyl acetate and ligroin as colorless needles of melting point 108° C.

*Example 28*

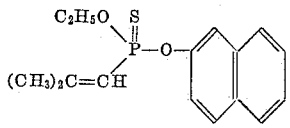

72 g. (0.5 mol) of β-naphthol are dissolved in 100 ml. of methanol. A sodium methylate solution containing 0.5 mol of dissolved sodium is added thereto. As described in the preceding examples, β-naphthol is then converted into the sodium salt. The latter is dissolved in 200 ml. of acetonitrile. 100 g. of isobutenyl-thionophosphonic acid-O-ethyl ester chloride (B.P. 50° C./0.01 Hg) are then added at 35° C. while stirring. The mixture is kept at 35° C. for a further hour and then worked up in usual manner. 76 g. of the new ester are thus obtained as a viscous, water-insoluble oil. Yield 50% of the theoretical.

Calculated for mol 306: S, 10.5%; P, 10.1%. Found: S, 10.7%; P, 10.1%.

Caterpillars are killed completely with 0.1% solutions.

*Example 29*

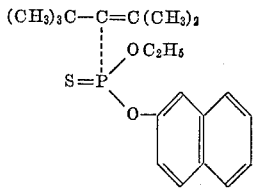

72 g. (0.5 mol) of β-naphthol are dissolved in 100 ml. of methanol. The β-naphthol employed is subsequently converted into the sodium salt in conventional manner. The latter is dissolved in 200 ml. of acetonitrile. 128 g. of isooctenyl-thionophosphonic acid-O-ethyl ester chloride (B.P. 70° C./0.01 mm. Hg) are then added at 35° C. while stirring. The mixture is kept at 10° C. for one hour and then worked up in usual manner. 68 g. of the new ester are thus obtained as a water-insoluble oil. Yield 38% of the theoretical.

Calculated for mol 362: S, 8.8%; P, 8.6%. Found: S, 9.1%; P, 8.6%.

By the same way there may be obtained the following compound:

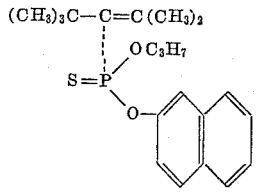

*Example 30*

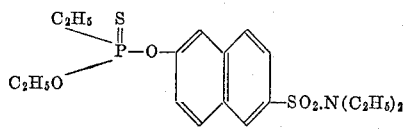

42 g. (0.15 mol) of 6-N,N-diethylsulfonamido-2-naphthol of M.P. 145–148° C. are dissolved in 250 ccm. of benzene and treated with a sodium methylate solution containing 0.15 mol of dissolved sodium. Benzene and methanol are distilled off and the residue is dissolved in 250 ccm. of methyl ethyl ketone. Subsequently, 28 g. (0.16 mol) of ethyl-thionophosphonic acid-O-ethyl ester chloride (B.P. 48° C./1 mm. Hg) are added dropwise at 30° C., the mixture is then heated to 60° C. for 3 hours and worked up as described in Example 1. The new ester is solid and melts at 78–81° C. after recrystallisation from benzene/petroleum ether. Yield 25 g. corresponding to 40% of the theoretical.

Caterpillars are killed completely with 0.1% solutions.

*Example 31*

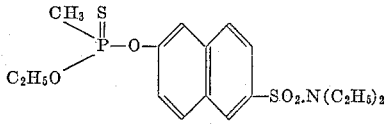

In a manner similar to that of Example 30, there are obtained from 42 g. (0.15 mol) of 6-N,N-diethylsulphonamido-2-naphthol and 32 g. (0.2 mol) of methyl-thionophosphonic acid-O-ethyl ester chloride, 34 g. of the above new compound of M.P. 85° C. Yield 57% of the theoretical.

By the same way there may be obtained the following compounds:

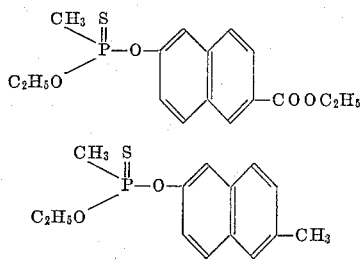

*Example 32*

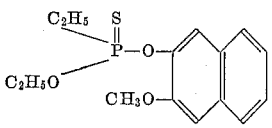

35 g. (0.2 mol) of 3-methoxy-2-naphthol of M.P. 94–98° C. are converted by means of a sodium methylate solution into the sodium salt and the latter is dissolved in 300 ccm. of methyl ethyl ketone. 43 g. (0.25 mol) of ethyl-thionophosphonic acid-O-ethyl ester chloride are added dropwise at 20° C. and the reaction mixture is kept at 60° C. for 2 hours. After working up in usual manner, 54 g. of the new ester are obtained as a water-insoluble oil. Yield 87% of the theoretical.

Spider mites are killed completely with 0.1% solutions. 0.01% solutions show a systemic action of 100%.

We claim:

1. The compound of the following formula:

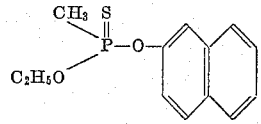

2. The compound of the following formula:

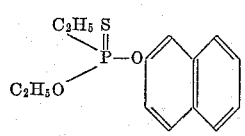

3. The compound of the following formula:

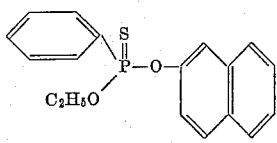

4. The compound of the following formula:

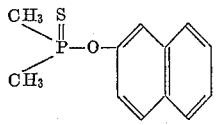

5. The compound of the following formula:

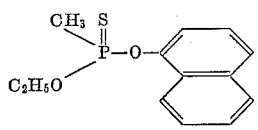

6. The compound of the following formula:

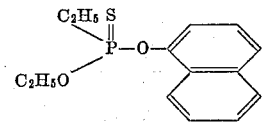

7. A compound of the formula

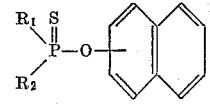

wherein $R_1$ is a member selected from the group consisting of lower alkyl and phenyl and $R_2$ is lower alkyl.

References Cited in the file of this patent
UNITED STATES PATENTS

| | | |
|---|---|---|
| 2,133,311 | Shuman | Oct. 18, 1938 |
| 2,535,175 | Tawney | Dec. 26, 1950 |
| 2,967,884 | Dunn et al. | Jan. 10, 1961 |

UNITED STATES PATENT OFFICE
CERTIFICATE OF CORRECTION

Patent No. 3,151,146 September 29, 1964

Gerhard Schrader et al.

It is hereby certified that error appears in the above numbered patent requiring correction and that the said Letters Patent should read as corrected below.

Column 3, line 59, for "O-naphthol" read -- β-naphthol --; column 5, line 36, for "-thionopho-" read -- -thionophos- --.

Signed and sealed this 6th day of April 1965.

(SEAL)
Attest:

ERNEST W. SWIDER
Attesting Officer

EDWARD J. BRENNER
Commissioner of Patents